Patented Feb. 12, 1935

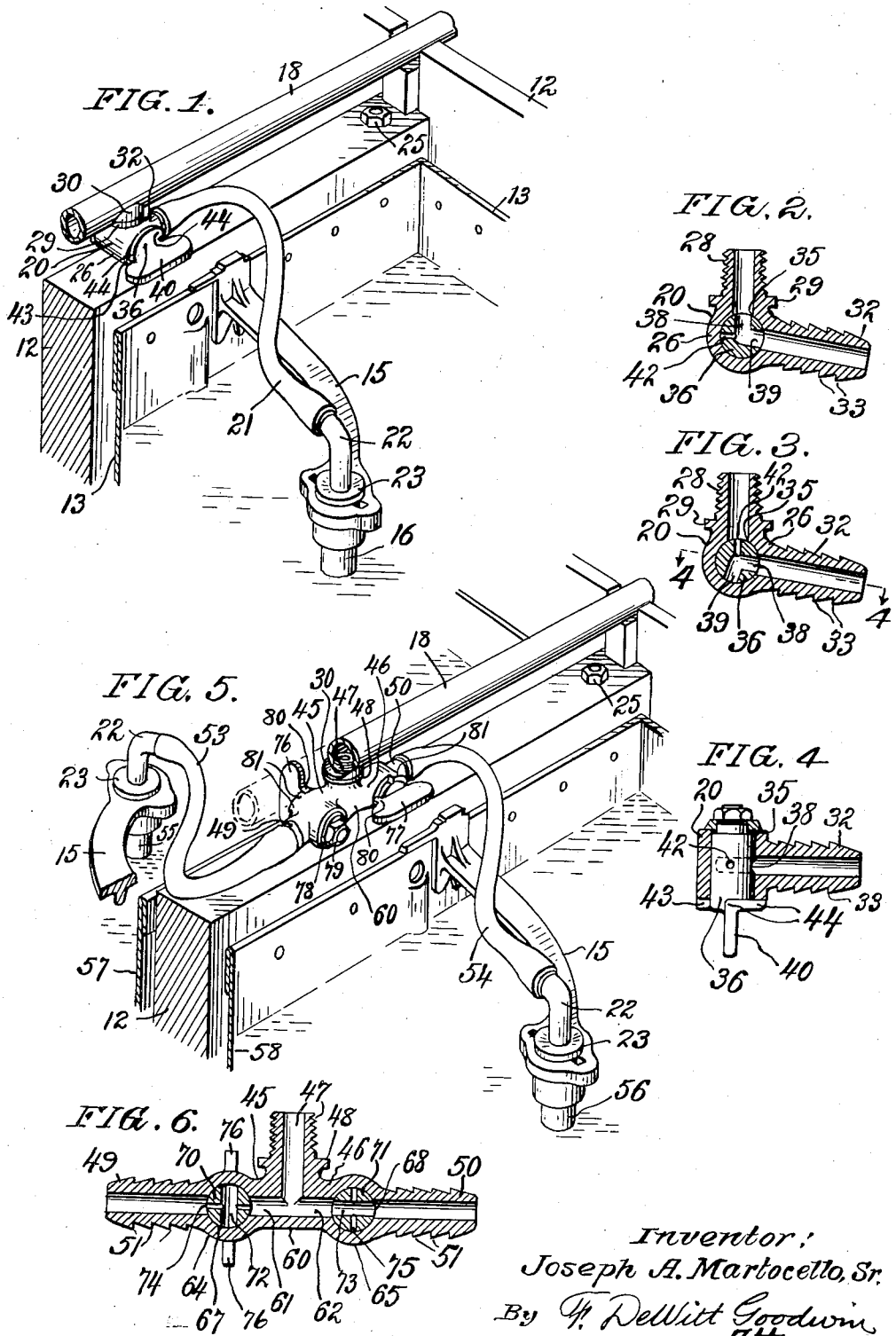

1,990,912

UNITED STATES PATENT OFFICE 1,990,912

ICE MANUFACTURING SYSTEM

Joseph A. Martocello, Sr., Philadelphia, Pa.

Application July 27, 1932, Serial No. 624,990

4 Claims. (Cl. 62—159)

My invention relates to improvements in ice manufacturing systems in which clear ice is obtained by using raw water and agitating the water by introducing air under pressure to the cans containing the water during the freezing operation.

The invention in this application, which is a partial continuation of my co-pending application, Serial Number 545,650, filed June 20, 1931, relates to the controlling of the air between the air supply pipe and the flexible connections with the drop tubes of the cans, whereby the controlling means is located within convenient reach of the operator.

The object of my invention is to provide an air controlling hose coupling adapted to be connected directly to the air supply pipe of the air circulating system.

A further object is to provide an air controlling hose coupling with inlet and outlet shanks for connecting the coupling with the air supply pipe and with a flexible hose, which in turn may be detachably connected with the drop tube of the individual ice cans.

A further object is to provide an air controlling hose coupling having a valve embodied therein for controlling two volumes of air to each drop tube.

A further object is to provide an air controlling hose coupling for controlling the supply of air to two separate drop tubes.

A further object is to provide a coupling having two independently operated valves for controlling the volume of air.

These, together with other novel features of construction and arrangement of the parts which will be more fully hereinafter described and claimed, constitutes my invention.

Referring to the accompanying drawing, Fig. 1 is a perspective view of a portion of an ice manufacturing system, embodying my invention.

Fig. 2 is a vertical sectional view of the elbow hose coupling shown in Fig. 1, and showing the valve stem in the full open position.

Fig. 3 is a view similar to Fig. 2 showing the valve stem positioned for the passage of a restricted volume of air.

Fig. 4 is a horizontal sectional view on line 4—4, Fig. 3.

Fig. 5 is a perspective view similar to Fig. 1 showing a double, or T, air controlling hose coupling for controlling the volume of air to the drop tubes of two cans.

Fig. 6 is a central, vertical sectional view of the coupling shown in Fig. 4.

In the accompanying drawing, in which like reference characters refer to like parts, 12 represents a supporting framework of an ice manufacturing system, in which the ice can 13 is placed. An off-set bracket 15 is detachably supported upon one edge of the can and adjustably supports the drop tube 16, within the can 13, in which the ice is formed.

The air supply pipe or lateral 18 is mounted upon the framework 12, for supplying air under pressure to the drop tubes 16 for agitating the water in the cans during the freezing process.

My novel air controlling hose coupling 20 forms a connection between the supply pipe 18 and the flexible hose 21, which in turn is connected with the elbow fitting 22, detachably connected with the ferrule 23, of the drop tube 16. An air check 25 is provided upon the framework 12 for receiving the fitting 22 when it is removed from the drop tube upon the completion of the freezing of the block of ice.

The coupling 20 shown in Figs. 1 to 3, includes a body 26 having a tubular inlet shank 28, provided with screw threads for connecting the shank to the supply pipe 18. A flange 29 is also provided upon the shank for engaging the pipe radius saddle washer 30 as shown in Fig. 1. The body 26 is also provided with a tubular outlet shank 32, having corrugations 33 for the attachment of the flexible hose 21.

The body 26 is provided with a cylindrical bore, or valve chamber 35, extending transversely relatively to the length of the shanks 28 and 32. The passageways of which shanks communicate with said chamber 35.

A cylindrical valve stem 36 is rotatably mounted in the bore, or chamber 35 of the body, for opening or closing the passage between the shanks 28 and 32. Said stem 36 is provided with large radial apertures 38 and 39 forming a large passageway through the stem. The stem may be rotated by means of a handle 40 to bring said apertures 38 and 39 into register with the passageways of the shanks 28 and 32, as shown in Fig. 2, for supplying a large volume of air to the ice cans. The stem 36 is also provided with a reduced aperture 42 which may be brought into register with the passageway of the shank 32, as shown in Fig. 3, for supplying a restricted volume of air to the ice cans. The body 26 and the stem 36 are provided with stops 43 and 44 which co-operate for locating the stem in the radial positions shown in Figs. 2 and 3.

The form of my invention shown in Figs. 5 and 6 comprises a double air controlling hose coupling 45 including a body 46, having a tubular inlet shank 47. Said shank is provided with the usual screw thread, for connecting the shank to the supply pipe 18. The shank 47 is also provided with a flange 48 which is clamped against the saddle washer 30, as shown in Fig. 5.

The body 46, of the coupling, is provided with two tubular outlet shanks 49 and 50, having corrugations 51 for the attachment of hose sections 53 and 54 which are connected with the elbow fittings 22 which in turn are detachably connected with the drop tubes 55 and 56 of two separate ice cans 57 and 58.

The coupling body 46 is provided with a central portion 60, having passageways 61 and 62, and enlarged portions 64 and 65 located between the central portion and the outlet shanks 49 and 50. Said enlarged portions 64 and 65 are provided with cylindrical, or conical bores, or valve chambers 67 and 68, in which are rotatably mounted cylindrical, or conical valve stems 70 and 71. Said stems have formed therein large apertures 72 and 73 respectively, and smaller or restricted apertures 74 and 75.

The valve stems 70 and 71 are provided with handles 76 and 77 respectively. Said stems are held in place within the body by washers 78 and nuts 79, shown in Fig. 5. Stops 80 and 81 are provided upon the stems and the body for locating the stems radially within the body, with the large or small apertures registering with the outlet shanks.

The operation of my invention is as follows: The air controlling hose coupling is installed in the air circulating system by attaching it directly to the air supply pipe 18 of the system. The flexible hose is attached between the outlet shank, of the coupling, and the elbow fitting 22 leading to the drop tube of the ice can.

The volume of air may be controlled by operating the valve stem of the air controlling hose coupling, which coupling is located at a convenient place within the reach of the operator, for supplying the full volume of air to the ice cans during the initial freezing operation. When the block of ice is partially formed with a core hole and the impurities concentrated therein, the core water is withdrawn and the core is refilled with clean, clear water. The valve stem of the air controlling hose coupling is turned to the position to reduce the volume of air, and the freezing process is continued with the reduced volume of air applied.

The form of my invention shown in Figs. 5 and 6 includes a double air controlling hose coupling for the connection of two hose leading to the drop tubes of two separate ice cans. This form of coupling includes two separate valve handles, which are conveniently located at a central position between two ice cans and may be operated at a great saving of time for controlling the volume of air to the cans.

When the freezing operation is completed the valves may be turned to a position to shut off the flow of air. By changing the position of the elbow fittings 22 from the drop tubes to the air checks 25, located at the top of the framework, the parts will not become damaged, when the ice cans are removed. By rigidly connecting the air controlling hose coupling directly upon the supply pipe, the danger of the coupling being injured, when the can is being inserted or removed, is eliminated.

Various changes in the construction and arrangement of the parts may be made without departing from my invention.

I claim:—

1. In a circulating system for an ice manufacturing system including an air supply pipe, a drop tube, a flexible hose, a connection between the hose and the drop tube, a body forming a coupling connected with said supply pipe and with said hose, and a valve stem movably mounted in said body and arranged for controlling two different volumes of air between the supply pipe and the drop tube.

2. In a circulating system for an ice manufacturing system, comprising an air controlling hose coupling having a shank arranged for the connection with an air supply pipe of the circulating system, and the other shank thereof arranged for connecting the coupling with a flexible hose, a valve body included in said coupling between the shanks, a valve stem rotatably mounted in said body, said stem having two apertures of different sizes formed through the same forming passageways between the shanks for controlling two different volumes of air to the shank connected with the hose.

3. In a circulating system for an ice manufacturing system including an air supply pipe, ice cans, a drop tube in each can, a flexible hose connected with each drop tube, a body, a tubular inlet shank upon the body forming a connection with the supply pipe, two outlet shanks upon the body forming hose connections for supplying air to two of said drop tubes, said body having passageways communicating between the inlet shank and the outlet shanks, valve stems rotatably mounted in said body for controlling the passageway to each outlet shank, said valve stems each having two apertures of different sizes formed through the same for controlling two different volumes of air through each of the outlet shanks.

4. In a circulating system for an ice manufacturing system including an air supply pipe, ice cans located adjacent to the supply pipe, a drop tube in each can, a flexible hose connected with each drop tube, a body, a tubular inlet shank upon the body connected with the supply pipe, outlet shanks upon the body connected with the hose leading to said tubes, valve stems rotatably mounted in said body, said stems each having radial apertures of different sizes formed through the same, stops upon each valve stem, and stops upon the body against which said stops upon the stems engage for limiting the rotation of the stems and for positioning said different apertures in the stems in register with the passageways between the inlet shank and the outlet shanks, with which the drop tubes are connected.

JOSEPH A. MARTOCELLO, Sr.